United States Patent
Gegout et al.

(10) Patent No.: US 9,510,388 B1
(45) Date of Patent: Nov. 29, 2016

(54) SYSTEM, METHOD, AND COMPUTER PROGRAM FOR AUTOMATICALLY DETERMINING A LOCATION-BASED NETWORK CONNECTION POLICY BY A MOBILE DEVICE

(71) Applicant: Amdocs Software Systems Limited, Dublin 3 (IE)

(72) Inventors: Cedric Gegout, Rennes (FR); Amit Gupta, Panchkula (IN)

(73) Assignees: Amdocs Development Limited, Limassol (CY); Amdocs Software Systems Limited, Dublin 3 (IE)

(*) Notice: Subject to any disclaimer, the term of this patent is extended or adjusted under 35 U.S.C. 154(b) by 0 days.

(21) Appl. No.: 14/831,751

(22) Filed: Aug. 20, 2015

(51) Int. Cl.
| | |
|---|---|
| H04L 12/28 | (2006.01) |
| H04W 76/04 | (2009.01) |
| H04W 48/16 | (2009.01) |
| H04W 4/02 | (2009.01) |

(52) U.S. Cl.
CPC .......... *H04W 76/043* (2013.01); *H04W 4/02* (2013.01); *H04W 48/16* (2013.01)

(58) Field of Classification Search
None
See application file for complete search history.

(56) References Cited

U.S. PATENT DOCUMENTS

| | | |
|---|---|---|
| 8,768,355 B2 | 7/2014 | Garcia Martin et al. |
| 2010/0075665 A1 | 3/2010 | Nader et al. |
| 2013/0029635 A1 | 1/2013 | Choi-Grogan et al. |
| 2013/0034019 A1 | 2/2013 | Mustajarvi |
| 2014/0187152 A1* | 7/2014 | Johnson .............. H04B 5/0031 455/41.1 |
| 2015/0173008 A1* | 6/2015 | Siddam ................ H04W 48/18 455/434 |
| 2015/0365884 A1* | 12/2015 | Ljung .................. H04W 48/16 455/436 |

FOREIGN PATENT DOCUMENTS

| | | | | |
|---|---|---|---|---|
| WO | WO2015014383 | * | 2/2015 | ............ H04W 48/18 |

OTHER PUBLICATIONS

"Wi-Fi Certified Wi-Fi Protected Setup™ adds NFC 'tap-to-connect' for simple set up of security-protected Wi-Fi® ievices and networks," Apr. 9, 2014, pp. 1-3, retrieved from www.wi-fi.org/news-events/newsroom/wi-fi-certified-wi-fi-protected-setup-adds-nfc-tap-to-connect-for-simple-set-up?utm_source=newsletter-english&utm_medium=email&utm_campaign=newsletter-december-2014.

* cited by examiner

*Primary Examiner* — Edan Orgad
*Assistant Examiner* — Rebecca Song
(74) *Attorney, Agent, or Firm* — Zilka-Kotab, PC

(57) ABSTRACT

A system, method, and computer program product are provided for automatically determining a location-based network connection policy by a mobile device, where the location-based network connection policy can be determined from information provided by a server. In use, a network connection policy for a network-enabled mobile device of a user is stored by the mobile device. Additionally, an identifier specific to a location of the mobile device is identified. An updated network connection policy is then automatically determined by the mobile device, using the identifier, for example via information sent to the mobile device by a server based on the identifier. Further, the updated network connection policy is implemented by the mobile device for controlling a network connection of the mobile device.

10 Claims, 8 Drawing Sheets

SYSTEM, METHOD, AND COMPUTER PROGRAM FOR AUTOMATICALLY DETERMINING A LOCATION-BASED NETWORK CONNECTION POLICY BY A MOBILE DEVICE

FIELD OF THE INVENTION

The present invention relates to mobile network communications, and more particularly to network connection policies for mobile devices.

BACKGROUND

Currently, mobile devices are configured to connect to mobile networks over which the mobile devices can communicate with other mobile devices, servers, etc. Since generally a mobile device may be within the vicinity of multiple mobile networks, network connection policies have been employed by mobile devices in order to control which mobile network a mobile device connects to at any given time. For example, the network connection policies may define a particular mobile network that a mobile device is to connect to at a particular location and/or at a particular time.

However, current techniques for providing those network connection policies to mobile devices have been associated with various limitations. For example, current techniques have been limited to two scenarios: 1) a server proactively pushes the network connection policy to the mobile device, or 2) the mobile device proactively pulls the network connection policy from the server.

However, typically in scenario 1) the server pushes a network connection policy to a mobile device whenever there has been a change made to the network connection policy by the server. The network connection policy is generally based on a subscription of the mobile device and a location of the mobile device, which then requires the server to keep track of the current locations and subscriptions of the mobile devices to determine when to send a particular network connection policy to a particular mobile device. This scenario may accordingly be impractical, or at the very least burdensome, for the server, particularly where there is a large number of mobile devices and/or locations being serviced by the server. Moreover, there may be location-specific promotions related to mobile networks that the server may be unaware of, such that the server may be incapable of properly updating the network connection policies in accordance with those promotions.

In scenario 2) the mobile device may not necessarily be aware of when a change has been made to the network connection policy by the server, and so the network connection policy employed by the mobile device may not always be up-to-date. Again, the server may also not be aware of location-specific promotions related to mobile networks, such that even a network connection policy pulled from the server may not necessarily be updated accordingly.

There is thus a need for addressing these and/or other issues associated with the prior art.

SUMMARY

A system, method, and computer program product are provided for automatically determining a location-based network connection policy by a mobile device. In use, a network connection policy for a network-enabled mobile device of a user is stored by the mobile device, and can be retrieved from a server. Additionally, an identifier specific to a location of the mobile device is identified. An updated network connection policy is then automatically determined by the mobile device, using the identifier, for example via information sent to the mobile device by a server based on the identifier. Further, the updated network connection policy is implemented by the mobile device for controlling a network connection of the mobile device.

DETAILED DESCRIPTION

Figure 1:
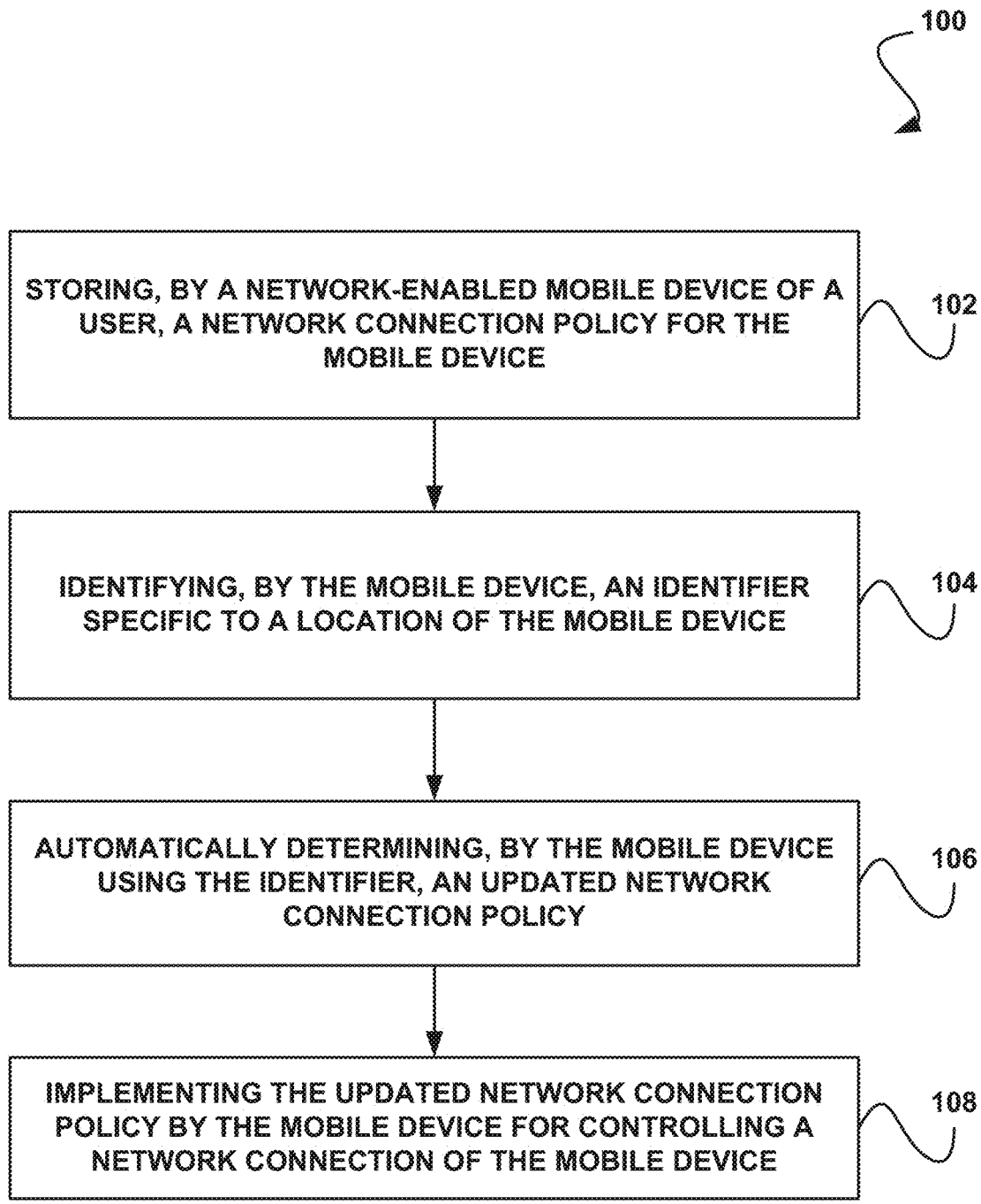
FIG. 1 illustrates a method of a mobile device for automatically determining a location-based network connection policy, in accordance with one embodiment.

FIG. 1 illustrates a method 100 of a mobile device for automatically determining a location-based network connection policy, in accordance with one embodiment. The method 100 may be performed by software and hardware of the mobile device. For example, hardware of the mobile device may execute an application or other code installed on the mobile device for performing the method 100.

As shown in operation 102, a network connection policy for a network-enabled mobile device of a user is stored by the mobile device. In the context of the present description, the mobile device may be any user-operated device that is transportable by the user and that is configured to connect to, and communicate over, one or more mobile networks (e.g. Wi-Fi networks, etc.). For example, the mobile device may be one of the mobile devices described below with reference to FIG. 7, such as a mobile phone, tablet, etc.

Further, the network connection policy for the mobile device may be any policy in memory of the mobile device that is implemented by the mobile device to control a network connection of the mobile device. In one embodiment, where a plurality of mobile networks are accessible to the mobile device, the network connection policy may include rules defining, for a particular location and/or a particular time, to which of those mobile networks the mobile device is to connect. Of course, the rules of the network connection policy may define any criteria, other than or in addition to location and time, for selecting one of the mobile networks for use by the mobile device. In other words, the mobile device may be instructed, or otherwise controlled, to connect to a particular one of a plurality of available mobile networks, in accordance with the network connection policy.

In a further embodiment, the network connection policy may be specific to the mobile device. For example, the network connection policy may only define criteria for mobile networks to which the mobile device (or user thereof) has a subscription, or to which a subscription is not required for use (e.g. "free" mobile networks). Of course, as another option, the network connection policy may include the subscription as a criterion for selecting mobile networks requiring the same.

In yet another embodiment, the network connection policy may be configured using the Access Network Discovery and Selection Function (ANDSF) protocol. In this embodiment, the network connection policy may be an Open Mobile Alliance Device Management (OMA-DM) tree. Also in this embodiment, the mobile device may be capable of interpreting the ANDSF protocol.

It should be noted, however, that other embodiments are contemplated in which the network connection policy may be configured using other protocols that are capable of being understood by mobile devices. Still yet, the network connection policy may initially be provided to the mobile device (or retrieved by the mobile device) from a server. The server may be operated by any service provider.

Additionally, as shown in operation 104, an identifier specific to a location of the mobile device is identified by the mobile device. In particular, the identifier may be located at the location of the mobile device (e.g. within a predefined physical proximity to the mobile device). Further, the identifier may be separate from the mobile device (i.e. not stored in, or otherwise located on, the mobile device). In one exemplary embodiment, the identifier may be printed on a sign located at the location of the mobile device (e.g. a store, airport, etc.).

In one embodiment, the identifier may be a Quick Response Code (QRCode). In another embodiment, the identifier may be a Near Field Communication (NFC) tag. In any case, the identifier may be of a format that is capable of being read by the mobile device.

An updated network connection policy is then automatically determined by the mobile device, using the identifier. Note operation 106. The mobile device may automatically determine the updated network connection policy by retrieving the updated network connection policy using the identifier, in one embodiment. For example, the updated network connection policy may be retrieved from the identifier itself, or from a server pointed to by the identifier.

In another embodiment, the mobile device may automatically determine the updated network connection policy by retrieving an update to the network connection policy already stored by the mobile device, and by applying that update to the network connection policy already stored by the mobile device. In this way, the update may be applied to only modify affected portions of the network connection policy existing on the mobile device. In this embodiment, the update may be retrieved from the identifier itself, or from a server pointed to by the identifier. Further examples of techniques that may be employed by the mobile device to automatically determine the updated network connection policy using the identifier will be described with reference to FIGS. 2-6 below.

By using the identifier to automatically determine the updated network connection policy, where the identifier is specific to the location of the mobile device, the updated network connection policy may also be specific to the location of the mobile device. For example, the updated network connection policy may be specific to a promotion associated with the location of the mobile device (e.g. a promotion of a store enabling a mobile network, where the mobile device is within or near the store, etc.). Thus, where the mobile device retrieves an update for its existing network connection policy, the update may be specific to the location of the mobile device. Further, where the mobile device retrieves an updated network connection policy, the updated network connection policy may include one or more changes to the mobile device's existing network connection policy that are specific to the location of the mobile device.

Of course, the updated network connection policy may also be specific to a subscription of the mobile device, a time during which the identifier specific to the location of the mobile device is identified by the mobile device, a time during which the updated network connection policy is being determined by the mobile device, etc., as described above.

Still yet, as shown in operation 108, the updated network connection policy is implemented by the mobile device for controlling a network connection of the mobile device. As described above, the mobile device may be instructed, or otherwise controlled, to connect to a particular one of a plurality of available mobile networks, in accordance with the updated network connection policy. For example, hardware or software of the mobile device may be configured to connect to a particular mobile network, as defined by the updated network connection policy. To this end, over time as the mobile device changes location and identifies new identifiers as described above, the method 100 may be performed repeatedly to implement up-to-date and location-specific network connection policies at the mobile device.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
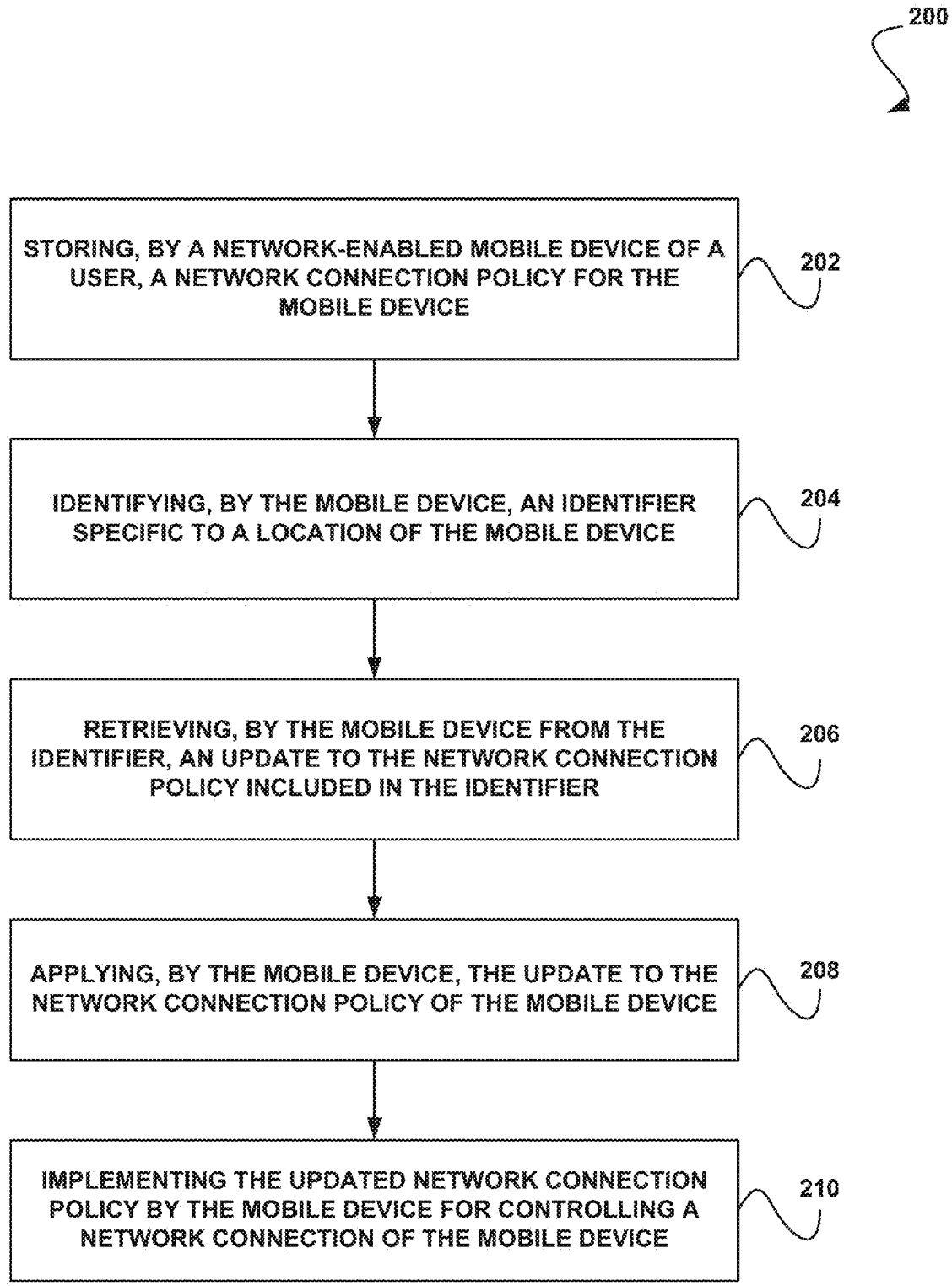
FIG. 2 illustrates a method of a mobile device for retrieving an updated network connection policy from a location-specific identifier, in accordance with another embodiment.

FIG. 2 illustrates a method 200 of a mobile device for retrieving an updated network connection policy from a location-specific identifier, in accordance with another embodiment. As an option, the method 200 may be carried out in the context of the details of FIG. 1. Of course, however, method 200 may be carried out in the context of any desired environment. Further, the aforementioned definitions may equally apply to the description below.

As shown in operation 202, a network connection policy for a network-enabled mobile device of a user is stored by the mobile device. Additionally, as shown in operation 204, an identifier specific to a location of the mobile device is identified. Next, an updated network connection policy is automatically determined by the mobile device, using the identifier, as shown in operations 206-208.

In particular, in operation 206, an update to the network connection policy that is included in the identifier is retrieved by the mobile device. Accordingly, the mobile device may read the update from the identifier. In this embodiment, the identifier may be configured to store a sufficient amount of data such that the identifier is able to store the update.

The update may be one or more changes to the network connection policy that is stored by the mobile device. For example, the update may be specific to the location of the identifier. As another option, the update may be in the form of one or more commands, which when executed by the mobile device, will modify the network connection policy that is stored by the mobile device. As an option, the update may be encoded in the identifier, in which case the mobile device may retrieve the update by reading the encoded update included in the identifier and then decoding the same. In the specific example of the ANDSF network connection policy, the update may be commands encoded in a binary format (e.g. as specified in the standard "OMA Device Management Tree and Description", i.e. OMA-TS-DM_TND), command encoded in the identifier using a base64 encoding, etc.

Then, in operation 208, the update is applied, by the mobile device, to the network connection policy of the mobile device. Applying the update may include modifying the network connection policy of the mobile device to include the update. For example, where the update includes one or more commands, the commands may be executed by the mobile device to modify the network connection policy of the mobile device. Once applied, the updated network connection policy is implemented by the mobile device for controlling a network connection of the mobile device. Note operation 210, as similarly described above with reference to operation 108 of FIG. 1. It should be noted that while the present method 200 is described above with reference to only the update to the mobile device's network connection policy being stored in the identifier, in another embodiment the identifier may store an entirety of the updated network connection policy (i.e. where storage limitations of the identifier permit storage of the updated network connection policy), such that the mobile device could then retrieve from the identifier the updated network connection policy for implementation thereof.

Figure 3:
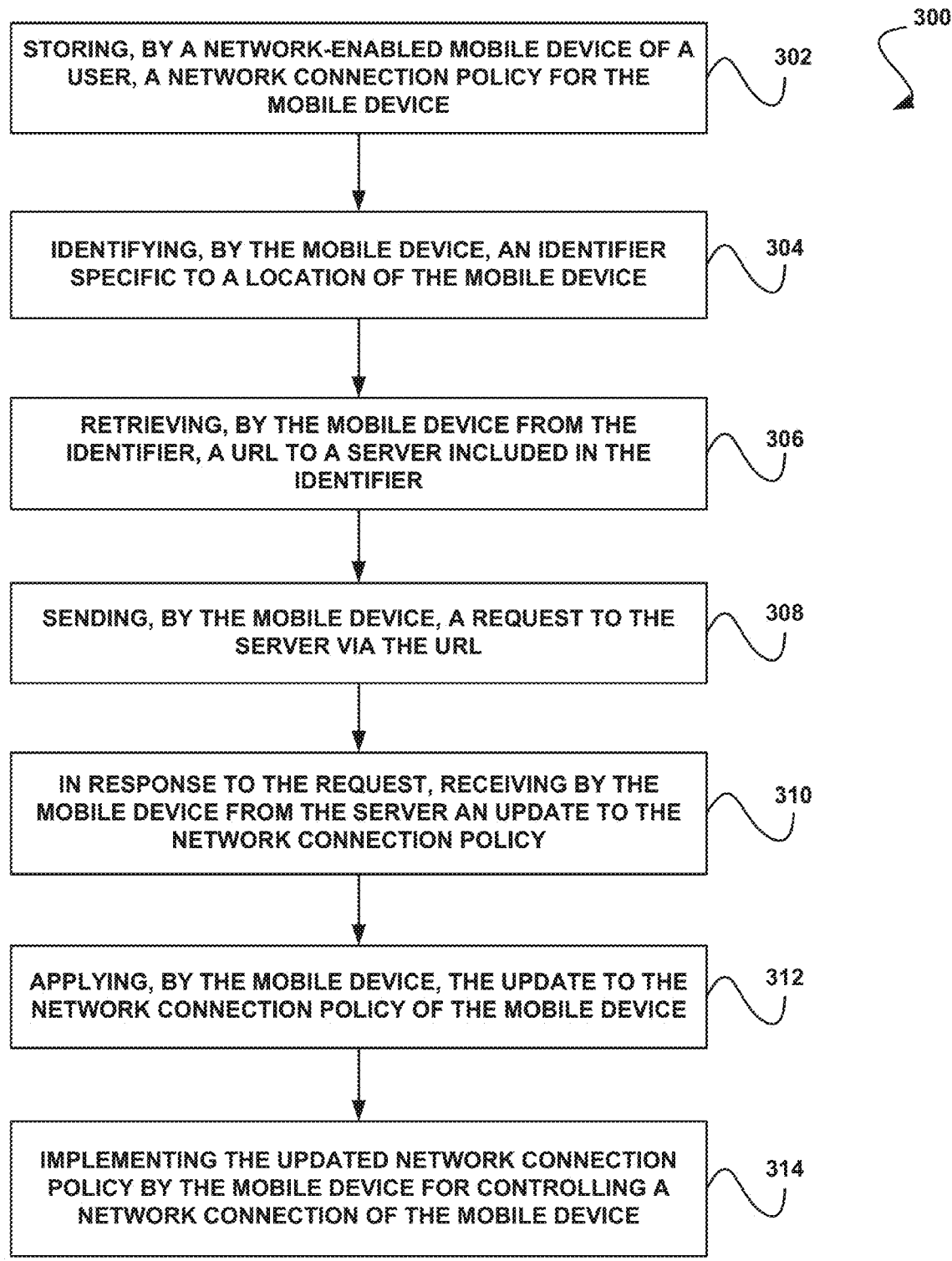
FIG. 3 illustrates a method of a mobile device for communicating with a server identified through a location-specific identifier to retrieve an update to a network connection policy of the mobile device, in accordance with yet another embodiment.

FIG. 3 illustrates a method 300 of a mobile device for communicating with a server identified through a location-specific identifier to retrieve an update to a network connection policy of the mobile device, in accordance with yet another embodiment. As an option, the method 300 may be carried out in the context of the details of FIG. 1. Of course, however, method 300 may be carried out in the context of any desired environment. Further, the aforementioned definitions may equally apply to the description below.

As shown in operation 302, a network connection policy for a network-enabled mobile device of a user is stored by the mobile device. Additionally, as shown in operation 304, an identifier specific to a location of the mobile device is identified. Next, an updated network connection policy is automatically determined by the mobile device, using the identifier, as shown in operations 306-312.

In particular, in operation 306, a uniform resource locator (URL) to a server included in the identifier is retrieved by the mobile device from the identifier. Of course, while a URL is described herein, it should be noted that the identifier may store any pointer to the server. As another option, the URL may point specifically to a file or other data set within the server that is associated with the location of the identifier, or the URL may have information included therein that identifies the location of the identifier.

Then, in operation 308, a request to the server is sent by the mobile device via the URL. The request may include the URL. The request may also include information describing the mobile device, the location of the identifier, or any other desired information.

Furthermore, in response to the request, the mobile device receives from the server an update to the network connection policy. Note operation 310. Thus, in response to the request, a connection between the mobile device and the server may be established, and the update to the network connection policy may be received over the connection by the mobile device from the server. Optionally, the establishment of the network connection may require an authorization of the mobile device (or user thereof) by the server. For example, the user or mobile device may be required to provide authentication information (e.g. username/password) which the server may authenticate prior to establishing the connection for sending the update.

As noted above, the URL may point specifically to a file or other data set within the server that is associated with the location of the identifier, or the URL may have information included therein that identifies the location of the identifier. This may allow the server to provide to the mobile device an update to the network connection policy that is specific to the location of the mobile device.

Still yet, in operation 312 the update is applied, by the mobile device, to the network connection policy of the mobile device. For example, similarly see operation 208 of FIG. 2. Once applied, the updated network connection policy is implemented by the mobile device for controlling a network connection of the mobile device. Note operation 314, as similarly described above with reference to operation 108 of FIG. 1.

Figure 4:
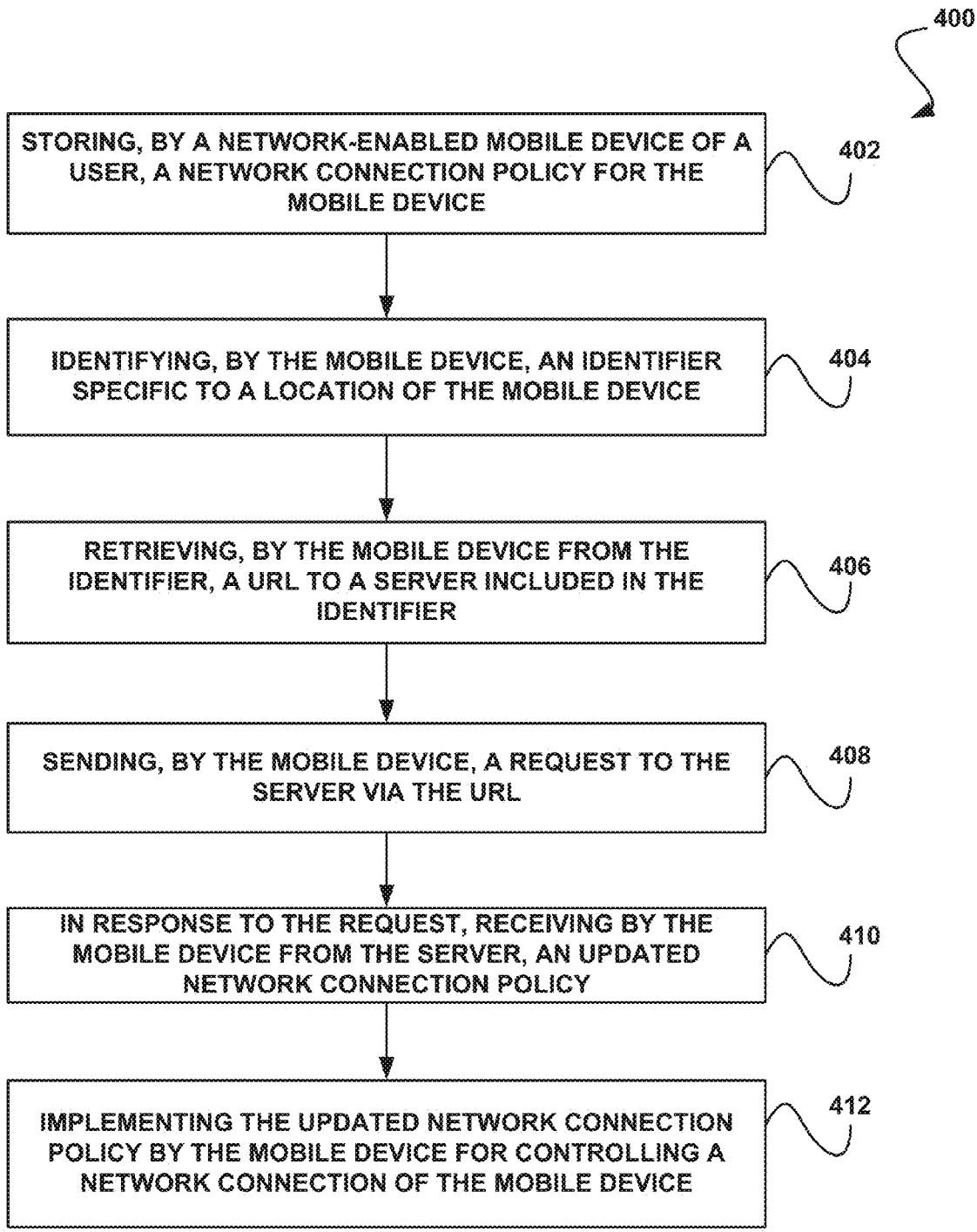
FIG. 4 illustrates a method of a mobile device for communicating with a server identified through a location-specific identifier to retrieve an updated network connection policy for the mobile device, in accordance with still yet another embodiment.

FIG. 4 illustrates a method 400 of a mobile device for communicating with a server identified through a location-specific identifier to retrieve an updated network connection policy for the mobile device, in accordance with still yet another embodiment. As an option, the method 400 may be carried out in the context of the details of FIG. 1. Of course, however, method 400 may be carried out in the context of any desired environment. Further, the aforementioned definitions may equally apply to the description below.

As shown in operation 402, a network connection policy for a network-enabled mobile device of a user is stored by the mobile device. Additionally, as shown in operation 402, an identifier specific to a location of the mobile device is identified. Next, an updated network connection policy is automatically determined by the mobile device, using the identifier, as shown in operations 406-410.

In particular, in operation 406, a uniform resource locator (URL) to a server included in the identifier is retrieved by the mobile device from the identifier. Similarly see operation 306 of FIG. 3. Then, in operation 408, a request to the server is sent by the mobile device via the URL (e.g. see similarly operation 408 of FIG. 3).

In response to the request, the mobile device receives from the server an updated network connection policy. Note operation 410. Thus, in response to the request, a connection between the mobile device and the server may be established, and the updated network connection policy may be received over the connection by the mobile device from the server. Optionally, the establishment of the network connection may require an authorization of the mobile device (or user thereof) by the server. For example, the user or mobile device may be required to provide authentication information (e.g. username/password) which the server may authenticate prior to establishing the connection for sending the updated network connection policy.

The URL may point specifically to an up-to-date network connection policy that is associated with the location of the identifier, or the URL may have information included therein that identifies the location of the identifier. This may allow the server to provide to the mobile device the updated network connection policy that is specific to the location of the mobile device.

Still yet, in operation 412 the updated network connection policy is implemented by the mobile device for controlling a network connection of the mobile device, as similarly described above with reference to operation 108 of FIG. 1.

Figure 5:
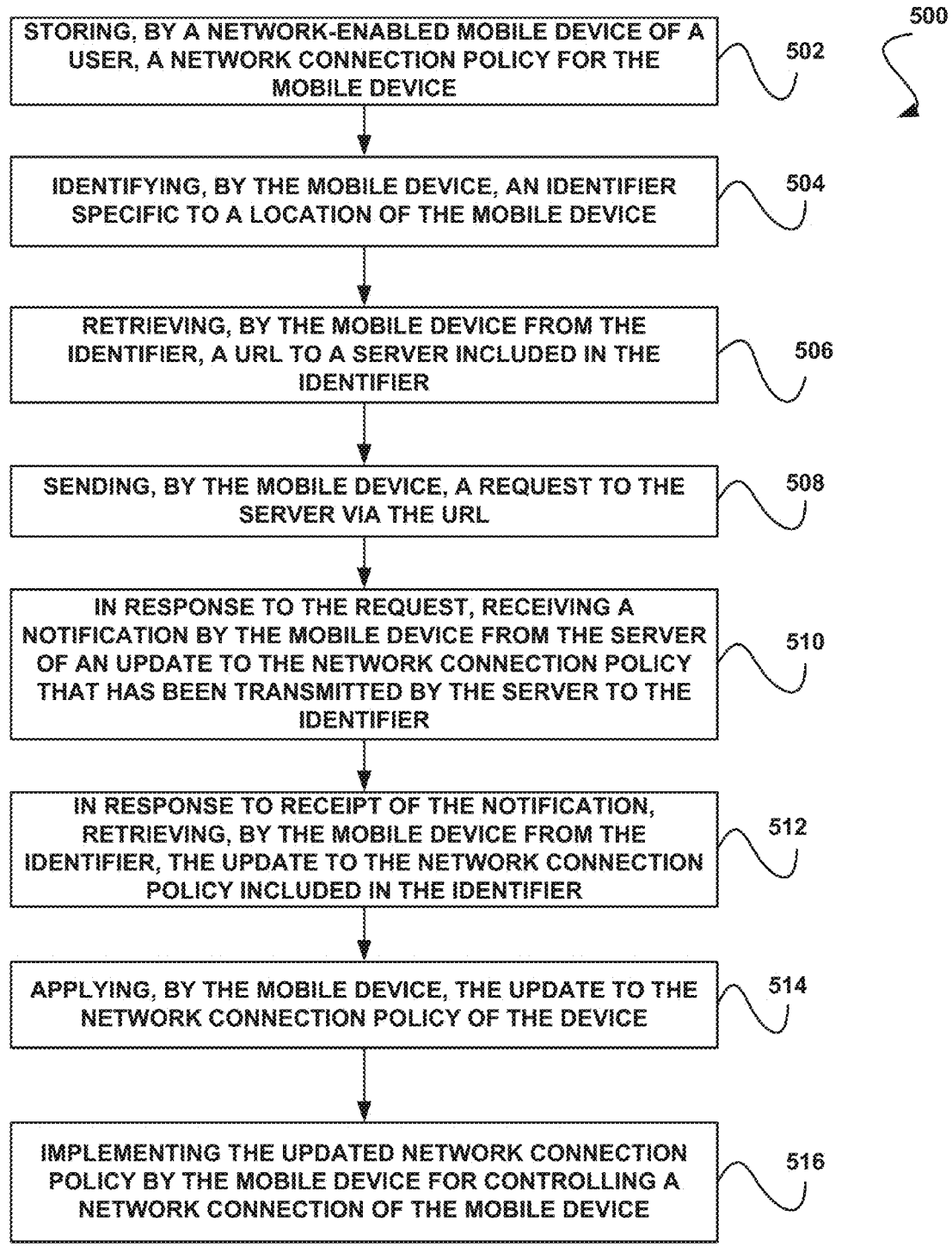
FIG. 5 illustrates a method of a mobile device for using a location-specific identifier to initiate the storage of an update to a network connection policy of the mobile device in the location-specific identifier and to retrieve the update for applying the same to the network connection policy of the mobile device, in accordance with a further embodiment.

FIG. 5 illustrates a method 500 of a mobile device for using a location-specific identifier to initiate the storage of an update to a network connection policy of the mobile device in the location-specific identifier and to retrieve the update for applying the same to the network connection policy of the mobile device, in accordance with a further embodiment. As an option, the method 500 may be carried out in the context of the details of FIG. 1. Of course, however, method 500 may be carried out in the context of any desired environment. Further, the aforementioned definitions may equally apply to the description below.

As shown in operation 502, a network connection policy for a network-enabled mobile device of a user is stored by the mobile device. Additionally, as shown in operation 504, an identifier specific to a location of the mobile device is identified. Next, an updated network connection policy is automatically determined by the mobile device, using the identifier, as shown in operations 506-514.

In particular, in operation 506, a uniform resource locator (URL) to a server included in the identifier is retrieved by the mobile device from the identifier. Similarly see operation 306 of FIG. 3. Then, in operation 508, a request to the server is sent by the mobile device via the URL (e.g. see similarly operation 308 of FIG. 3).

In response to the request, a notification is received by the mobile device from the server, where the notification is of an update to the network connection policy that has been transmitted by the server to the identifier. Note operation 510. For example, in response the request from the mobile device, the server may identify an update to the network connection policy of the mobile device and may transmit the update to the identifier for storage therein.

As option, in addition to the URL retrieved in operation 506, the mobile device may also receive from the identifier a request for authorization information. For example, the identifier may only allow the mobile device to automatically determine the updated network connection policy based on the authorization information. Thus, when the mobile device sends the request to the server, the mobile device may include in the request authentication information for authentication by the server. If the server authenticates the mobile device, the server may transmit to the identifier (e.g. with the network connection policy update) the authorization requested by the identifier. Of course, other embodiments are contemplated in which the mobile device may be authorized, and this may be per the request (or requirement) of the identifier as described above or as a requirement of the server prior to sending the network connection policy update to the identifier.

Then, in response to receipt of the notification, the mobile device retrieves from the identifier the update to the network connection policy included therein. Note operation 512. See similarly operation 206 of FIG. 2. The update is next applied, by the mobile device, to the network connection policy of the mobile device, as shown in operation 514. See similarly operation 208 of FIG. 2.

Still yet, in operation 516 the updated network connection policy is implemented by the mobile device for controlling a network connection of the mobile device, as similarly described above with reference to operation 108 of FIG. 1.

It should be noted that while the present method 500 is described above with reference to only the update to the mobile device's network connection policy being stored in the identifier, in another embodiment the identifier may store an entirety of the updated network connection policy (i.e. where storage limitations of the identifier permit storage of the updated network connection policy), such that the mobile device could then retrieve from the identifier the updated network connection policy for implementation thereof.

Figure 6:
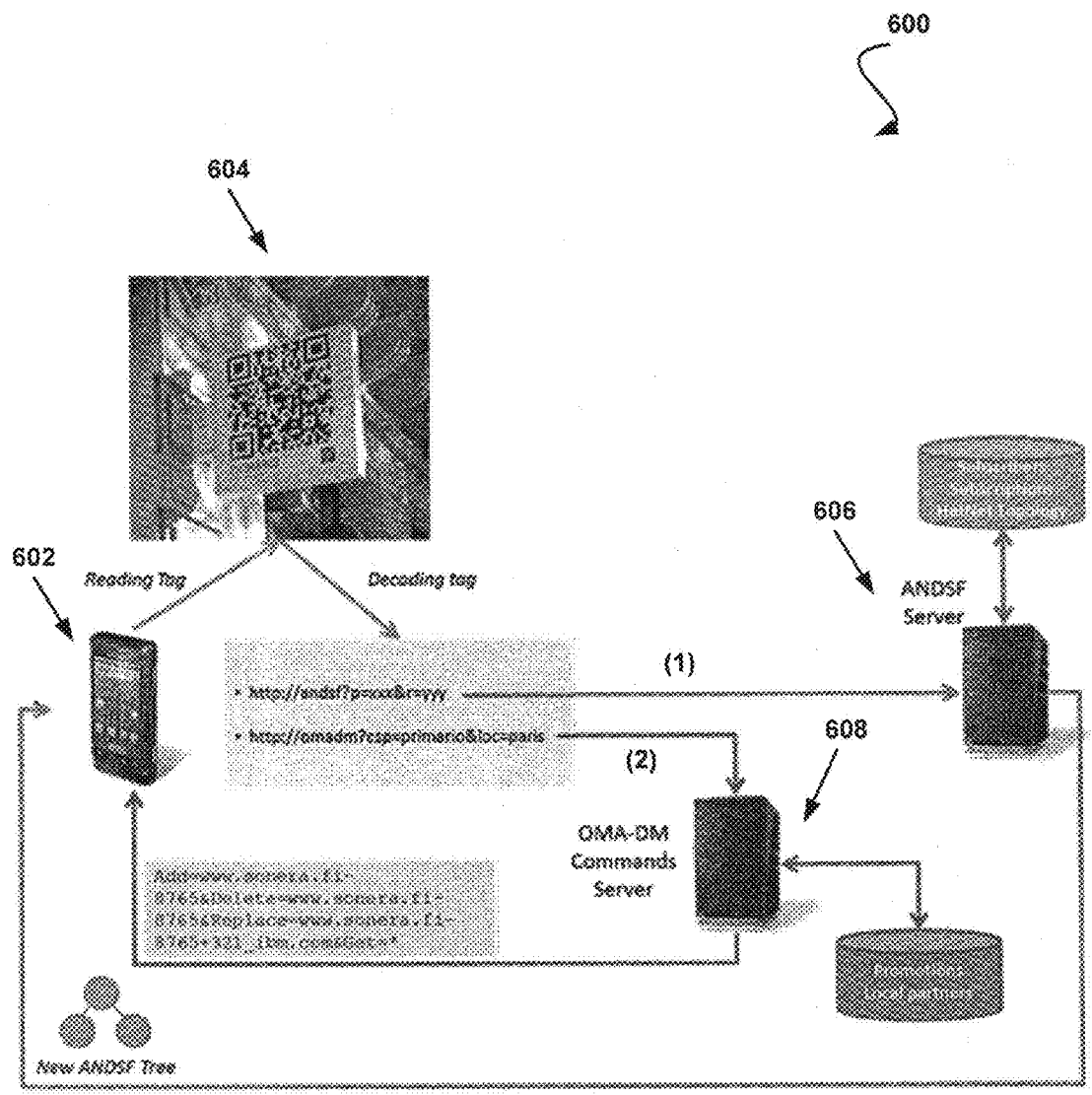
FIG. 6 illustrates a system for automatically determining a location-based network connection policy, in accordance with another embodiment.

FIG. 6 illustrates a system 600 for automatically determining a location-based network connection policy, in accordance with another embodiment. As an option, the system 600 is shown as implementing the methods described above with respect to FIGS. 1-5. Of course, it should be noted that the system 600 may be implemented in the context of any desired environment. Further, the aforementioned definitions may equally apply to the description below.

As shown, a network-enabled mobile device of a user 602 reads an encoded identifier (shown as a tag) 604 specific to a location of the mobile device 602. For example, the encoded identifier 604 may be on a sign posted at a location of the mobile device 602 (e.g. a storefront). The encoded identifier 604 is decoded by the mobile device 602.

In embodiment (1) shown, the decoded identifier 604 is a URL to a server 606 (ANDSF server in the example shown). The URL may include a parameter indicating the location of the identifier 604. The mobile device 602 sends a request to the ANDSF server 606 via the URL. In response to receipt of the request, the server 606 determines an updated network connection policy specific to the location of the identifier 604. The updated network connection policy includes information about the mobile network topology (e.g. where are the mobile network access points, priorities between those access points based on criteria, etc.). The updated network connection policy is then sent by the server 606 to the mobile device 602. This embodiment (1) ensures that the mobile device 602 is up-to-date with regards to the mobile network topology.

In embodiment (2) shown, the decoded identifier 604 is a URL to a commands server 608 (OMA-DM commands server as shown). Again, the URL may include a parameter indicating the location of the identifier 604. The mobile device 602 sends a request to the commands server 608 via the URL. In response to receipt of the request, the commands server 608 determines an update to a network connection policy of the mobile device 602 that is specific to the location of the identifier 604. With respect to an ANDSF network connection policy at the mobile device 602, the update may be in the form of OMA-DM commands that are executable at the mobile device 602 to update the ANDSF network connection policy stored at the mobile device 602. In one exemplary embodiment, the update may be related to a promotion (e.g. of a store, etc.) which increases the priority of one mobile network (e.g. provided by the store) to have priority over another mobile network (e.g. provided by another provider) when the mobile device 602 is within a predetermined area specific to the location of the identifier 604.

Client-Side System

In one embodiment, a system may comprise a network-enabled mobile device of a user having memory and one or more processors coupled to the memory for: storing, in the memory, a network connection policy for the mobile device; identifying, by the mobile device, an identifier specific to a location of the mobile device; automatically determining, by the mobile device using the identifier, an updated network connection policy; and implementing the updated network connection policy by the mobile device for controlling a network connection of the mobile device.

Server-Side System

In another embodiment, a system may comprise a server having, or connected, to memory (e.g. a database), and having one or more processors coupled to the memory for: storing in the memory information capable of being used by a mobile device to determine an updated network connection policy; and providing, by the server, the information to the mobile device based on a location-specific identifier read by the mobile device. The server may perform the storing and the providing for any number of different network connection policies, mobile devices, and/or location-specific identifiers.

Optionally, the information may be provided by the server directly to the mobile device, or may be provided by the server to the mobile device through the location-specific identifier. Further, the information may be provided by the server responsive to the mobile device identifying the location-specific identifier and communicating the location-specific identifier (or any other location-specific information) to the server. For example, the server may automatically determine the information using the location-specific identifier or other location-specific information received from the mobile device. The server may communicate the information using the Access Network Discovery and Selection Function protocol.

The information provided by the server may include, for example, the updated network connection policy itself or an update to an existing network connection policy stored by the mobile where the update is capable of being applied to the existing network connection policy by the mobile device. In any case, the updated network connection policy and the update are both specific to the location of the mobile device, and may further be specific to a promotion associated with the location of the mobile device, a subscription of the mobile device, a time during which the location-specific identifier or other location-specific information is received by the server from the mobile device, a time during which the updated network connection policy or update is determined by the server, etc.

As yet another option, the server may require authorization information prior to providing the information to the mobile device. Further to this option, the server may send a request for authorization information to the mobile device (e.g. responsive to receiving the location-specific identifier or other location-specific information from the mobile device).

It should be noted that the client-side system and/or server-side system may be implemented with, but are not necessarily limited by, any of the above described details and embodiments.

Figure 7:
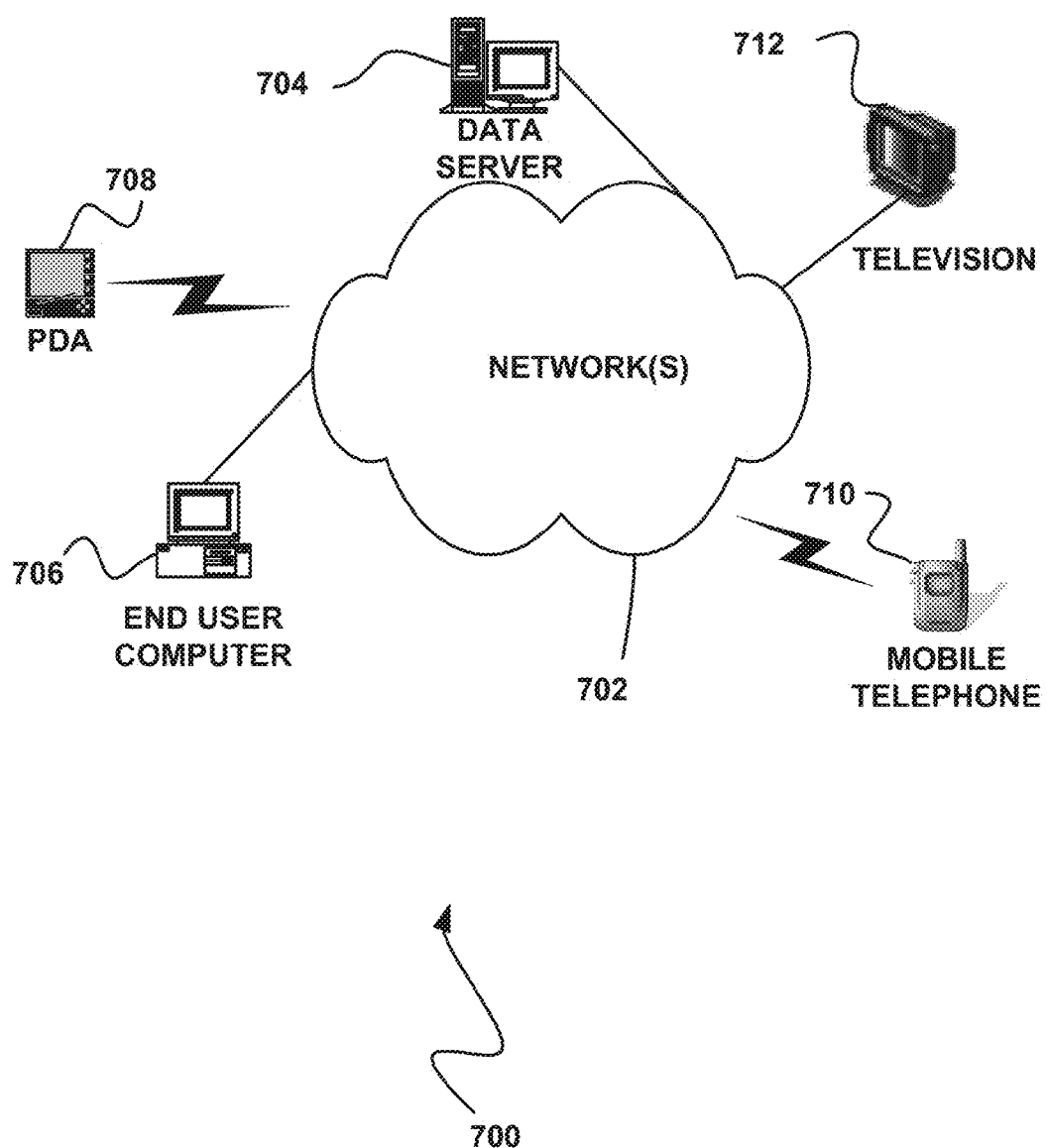
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
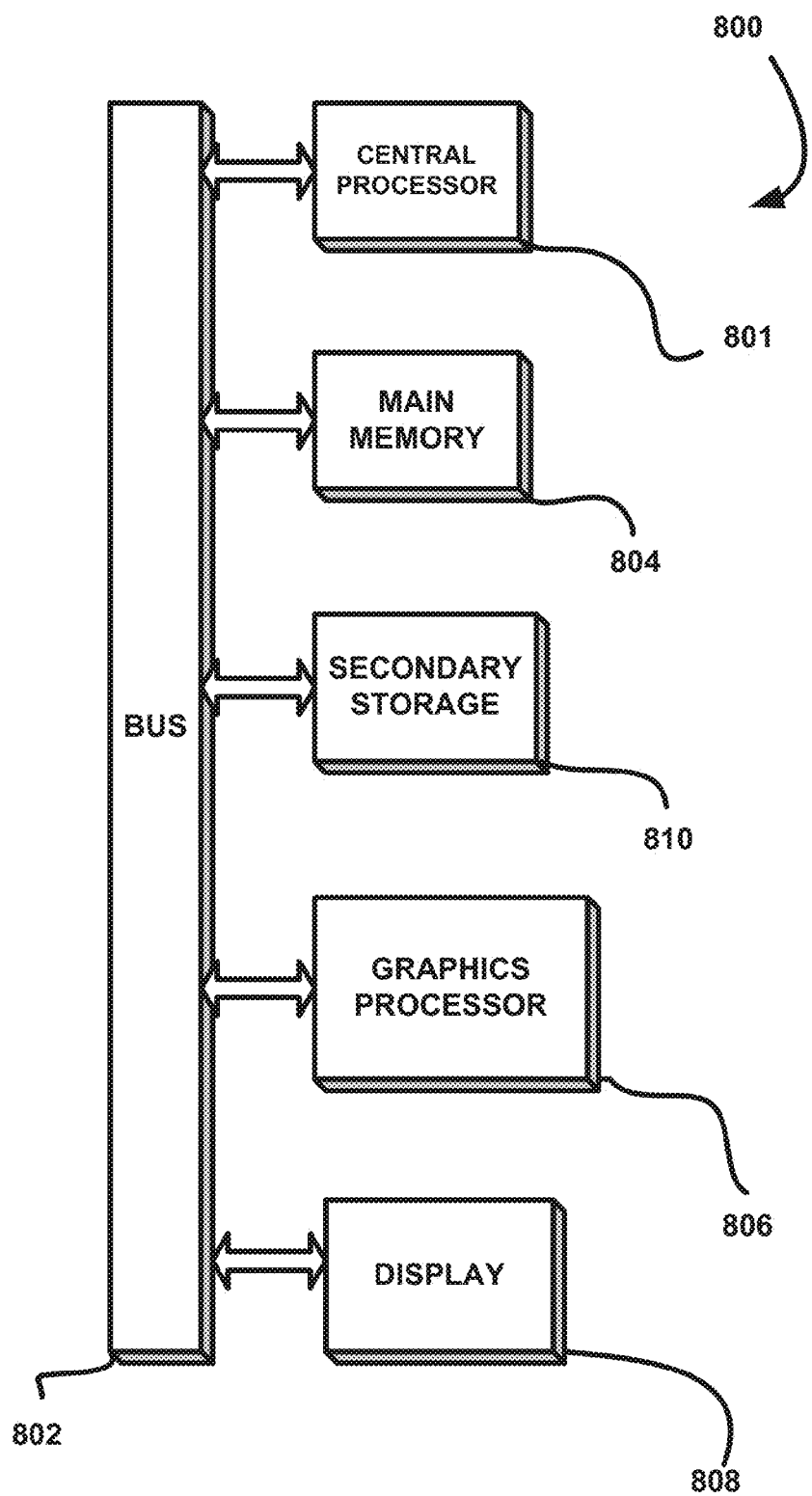
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    storing, by a network-enabled mobile device of a user, a network connection policy for the mobile device;
    identifying, by the mobile device from a remote device at a location of the mobile device, an identifier specific to the location of the mobile device, the identifier being a Quick Response Code (QRCode) or a Near Field Communication (NFC) tag and the identifier including:
    a uniform resource locator (URL) to a server, and
    a request for authorization information;
    reading, by the mobile device from the identifier, the URL and the request;
    sending, to the server via the URL by the mobile device, the requested authorization information with a request for an updated network connection policy, wherein the server uses the authorization information to authorize the mobile device and in response sends to the identifier authorization for the mobile device and the updated network connection policy;
    after sending the request for the updated network connection policy, receiving by the mobile device from the server, a notification that the updated network connection policy has been transmitted by the server to the identifier;
    responsive to receipt of the notification, automatically determining, by the mobile device from the identifier, the updated network connection policy; and implementing the updated network connection policy by the mobile device for controlling a network connection of the mobile device.

2. The method of claim 1, wherein the network connection policy is configured using the Access Network Discovery and Selection Function protocol.

3. The method of claim 1, wherein the network connection policy includes rules defining, for a particular location and/or a particular time, one of a plurality of mobile networks accessible to the mobile device to which the mobile device is to connect.

4. The method of claim 1, wherein the updated network connection policy is specific to the location of the mobile device.

5. The method of claim 4, wherein the updated network connection policy is specific to a promotion associated with the location of the mobile device.

6. The method of claim 1, wherein the updated network connection policy is specific to a subscription of the mobile device.

7. The method of claim 1, wherein the updated network connection policy is specific to a time during which the identifier specific to the location of the mobile device is identified by the mobile device.

8. The method of claim 1, wherein the updated network connection policy is specific to a time during which the updated network connection policy is being determined by the mobile device.

9. A non-transitory computer readable medium comprising computer code that, when executed, perform a method comprising:
storing, by a network-enabled mobile device of a user, a network connection policy for the mobile device;
identifying, by the mobile device from a remote device at a location of the mobile device, an identifier specific to the location of the mobile device, the identifier being a Quick Response Code (QRCode) or a Near Field Communication (NFC) tag and the identifier including:
a uniform resource locator (URL) to a server, and
a request for authorization information;
reading, by the mobile device from the identifier, the URL and the request;
sending, to the server via the URL by the mobile device, the requested authorization information with a request for an updated network connection policy, wherein the server uses the authorization information to authorize the mobile device and in response sends to the identifier authorization for the mobile device and the updated network connection policy;
after sending the request for the updated network connection policy, receiving by the mobile device from the server, a notification that the updated network connection policy has been transmitted by the server to the identifier;
responsive to receipt of the notification, automatically determining, by the mobile device from the identifier, the updated network connection policy; and
implementing the updated network connection policy by the mobile device for controlling a network connection of the mobile device.

10. A method, comprising:
receiving, by a server from a mobile device, a request for an updated network connection policy, the server being located by the mobile device using an identifier specific to a location of the mobile device that includes a Quick Response Code (QRCode) or a Near Field Communication (NFC) tag having:
a uniform resource locator (URL) to the server, and
a request for authorization information;
identifying, from the request for the updated network connection policy by the server, the requested authorization information;
authorizing, by the server, the mobile device using the authorization information;
responsive to authorizing the mobile device, sending to the identifier, by the server, an authorization for the mobile device and the updated network connection policy;
sending, to the mobile device by the server, a notification that the updated network connection policy has been transmitted by the server to the identifier for retrieval by the mobile device.

\* \* \* \* \*